No. 875,617. PATENTED DEC. 31, 1907.
W. N. PARKES.
ZIGZAG AND ORNAMENTAL STITCH MACHINE.
APPLICATION FILED OCT. 26, 1903.

WITNESSES:
J. B. McGirr.
M. Herskovitz

INVENTOR.
William N. Parkes
BY
Chas. M. C. Chapman
ATTORNEY

No. 875,617. PATENTED DEC. 31, 1907.
W. N. PARKES.
ZIGZAG AND ORNAMENTAL STITCH MACHINE.
APPLICATION FILED OCT. 26, 1903.

WITNESSES:
J. B. McGurr
N. Herskovitz

INVENTOR.
William N. Parkes
BY
Chas. M. C. Chapman
ATTORNEY

UNITED STATES PATENT OFFICE.

WILLIAM N. PARKES, OF BROOKLYN, NEW YORK.

ZIGZAG AND ORNAMENTAL STITCH MACHINE.

No. 875,617.

Specification of Letters Patent.

Patented Dec. 31, 1907.

Application filed October 26, 1903. Serial No. 178,629.

*To all whom it may concern:*

Be it known that I, WILLIAM N. PARKES, a citizen of the United States, residing in Brooklyn, county of Kings, and State of New York, have invented a new and useful Improvement in Zigzag and Ornamental Stitch Machines, of which the following is a description.

This invention relates to the class of zigzag-stitch machines in which a needle or needles are reciprocated vertically and moved laterally, or more especially, to embroidery or ornamental stitch machines.

One of the main objects of the invention is to provide a machine with two or more reciprocating needles, to move said needles laterally different extents relative to each other, and to guide a filling material under the stitches made by one or both of said needles.

Other important objects will be seen or set forth in connection with the description.

The invention consists of the various parts and combination of parts, illustrated, described, and specifically set forth in the claims.

It is to be noticed that my double stitch forming-mechanism is intended for use in buttonhole and other special machines as well as the machines above mentioned. It is also to be noted that in this machine, the complemental stitch-forming mechanism and the needle-operating mechanism are so located and constructed as to advantageously coöperate with each other and thereby increase the scope of the lateral movements of the said needles.

The preferred means herein disclosed for maintaining the relation between the eye of a needle and the beak of the looper in the lateral positions of loop engagement is illustrated, described and claimed in my co-pending application Serial No. 93,037, filed February 7, 1902. And the preferred means for moving the needles laterally is illustrated and described in my co-pending application Serial No. 179,470, filed November 2, 1903.

Any suitable feeding mechanism may be used in combination with my present invention for moving the work, but preferably I use the feeding mechanism shown and described in my co-pending application filed March 30, 1903 Serial Number 150,182. The feeding mechanism shown in the said application is especially adapted for use in combination with my stitch forming mechanism as herein shown and described, but as this feeding mechanism forms no part of my present invention it is not illustrated or described in this application.

Referring to the drawings; Fig. 3 is a top plan view of the machine.

It is to be noted that I have shown in the drawings, a single looper to coöperate with the two needles shown, this being desirable for certain ornamental and useful effects; but, I desire it understood that a looper for each needle may be used and that such combination is within the scope of my invention. It is also to be understood that, though I have shown but two needles,—one in each holder,—a larger number may be employed and as many as may be desirable can be carried by each holder.

In the drawings A represents the arm of the machine, B the base, C the driving shaft, D the lower shaft, E the driving pulley and hand-wheel. On the upper shaft C is mounted a sprocket-wheel 1 which engages a chain 2, which in turn engages a sprocket-wheel 3 mounted on the lower shaft D of the machine. This drive from the shaft C to the shaft D is a regular one-to-one movement. To the forward end of the shaft D, I attach a bevel-gear 4 which meshes with and operates a bevel-gear 5 attached to a vertical shaft 6 mounted in a bracket 7 supported by the bed B of the machine. To the upper end of shaft 6 is attached a hook or looper 8 which is formed and adapted to carry a bobbin-case 9, the latter being adapted to carry a bobbin or cop of thread, not shown. The gears 4 and 5 are so proportioned as to impart to the looper two complete rotations to a single rotation of the shaft 6, and hence two rotations to a single reciprocation of the needle-bar. This is the preferred form of looper mechanism for coöperating with the needles; but it is to be understood that in certain of my claims limitation will not be made thereto, and such claims will comprehend any complemental mechanism found suitable for my purposes.

Figures 4, 5, 12, 13, 28, 29:
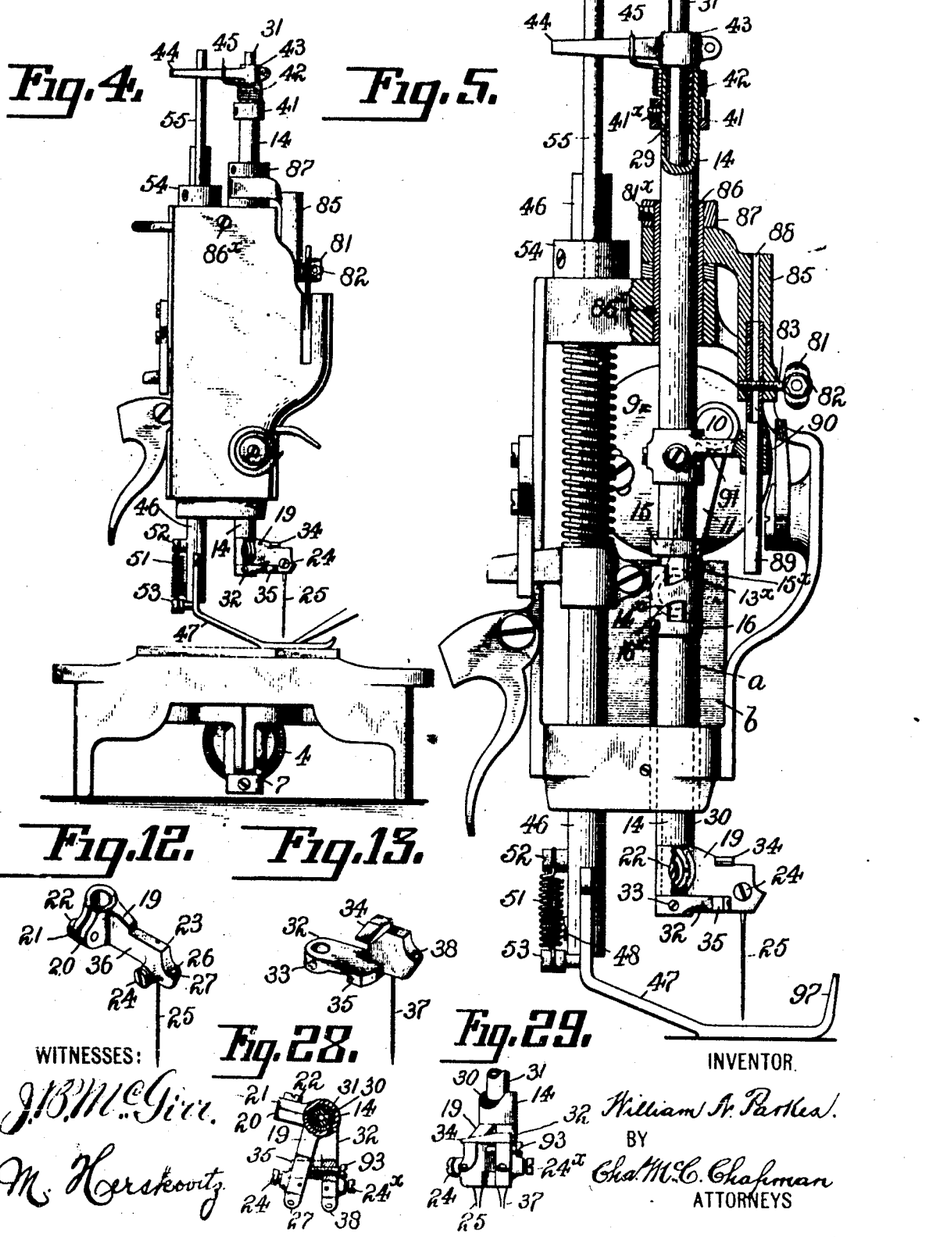
Fig. 4 is a front end elevation of the machine.
Fig. 5 is an enlarged face view of the head, the face-plate being removed, and some parts being in section to show the interior construction of the same.
Fig. 12 is a perspective of one of the needle carriers.
Fig. 13 is a like view of the other needle carrier.
Fig. 28 is a partial plan and section of another form of needle-holder.
Fig. 29 is a front elevation of the holder of Fig. 28.
Figure 17:
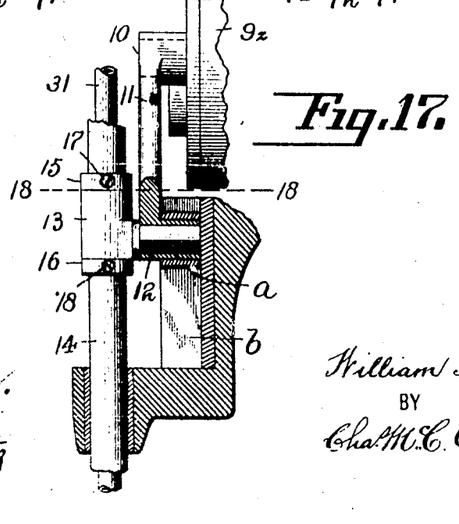
Fig. 17 is a detail partly in section showing means for actuating the needle-bar.
Figure 18:
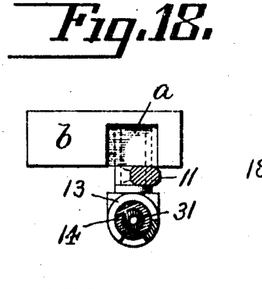
Fig. 18 is a detail sectional view, taken on the line 18—18 of Fig. 17.

To the forward end of the shaft C is attached a disk 9×, which carries a crank pin 10, to which is connected the upper end of the link 11, the lower end of which link is mounted on a stud or projection 12, see Fig. 17, extending from a cam-part 13 which is mounted loosely on a needle-bar or carrier 14; the part 13 permitting the needle-bar 14 to turn or be oscillated. Collars 15 and 16 on which are respectively formed cam surfaces 15× and 16× are secured by set screws 17 and 18 to the needle-bar 14 and serve as a means for retaining the cam-part 13 in position on the needle-bar 14. On part 13 is formed cam surfaces 13× and 14× which are adapted to coöperate with cam surfaces 15× and 16× as shown in Fig. 5, these cam surfaces acting to change and vary the thrust of the needle accordingly as the same is moved laterally, and as is more fully described in my application No. 93,037, filed February 7, 1902. This connection, as is of course understood, permits the needle-bar 14 to be turned on its vertical axis and when thus turned the vertical working position of the needles is changed so as to vary the thrust of the needles and thus maintain vertically the same coöperative position of needles and looper in all the lateral working positions of the needles. To the lower end of the needle-bar 14 is attached a needle-holder 19, lugs 20 and 21 and screw 22 serving as a means for clamping the same to said needle-bar as is clearly shown in Fig. 12. This needle holder 19 has an extending portion 23 in which is secured, by a screw 24, a needle 25, and projection 26, through which a hole 27 is bored, serves as a means for leading the thread to needle 25. The axis of the needle-bar 14 is coincident with the axis of the looper 8, and the distance between the center of the needle-bar 14 and the needle 25 is substantially the distance between the axis of the said hook and the periphery of the same, plus the thickness of the needle, so that the needle operates just outside of the looper, thus enabling a beak 28 formed on the looper to engage the loop of the needle-thread.

The needle-bar 14 is tubular and has located in its upper end a bushing 29 and in its lower end a bushing 30 which serve as a bearing for a second or auxiliary needle-bar 31 which extends through the same and which is also tubular. To the lower end of the needle-bar 31 I attach a second or auxiliary needle holder 32, which is secured to the said bar by means of the screw 33. Needle-holder 32 has formed on it projections 34 and 35 which are adapted to embrace the part 36, of extension 23 of holder 19, see Figs. 10 and 12. This formation of the needle-holder 32 prevents any vertical movements of the same and through it any vertical movement of the auxiliary needle-bar 31, but at the same time it permits the needle-holders 32 and 19 to be oscillated laterally independently of each other. The needle-holder 32 carries a needle 37, held by means of screw 24×, and has formed in it a thread eye or guide 38 which is so located and formed as to properly lead the thread to the needle. To the upper end of the needle-bar 14, I attach a collar 39 by means of set screws 40, the collar having a hole 41 formed in it which serves as a receptacle for an extended end of a coiled spring 42. To the upper end of the auxiliary needle-bar 31 is clamped a collar 43 which has an extending arm 44, the said arm being engaged by an end 45 of the spring 42.

Figure 1:
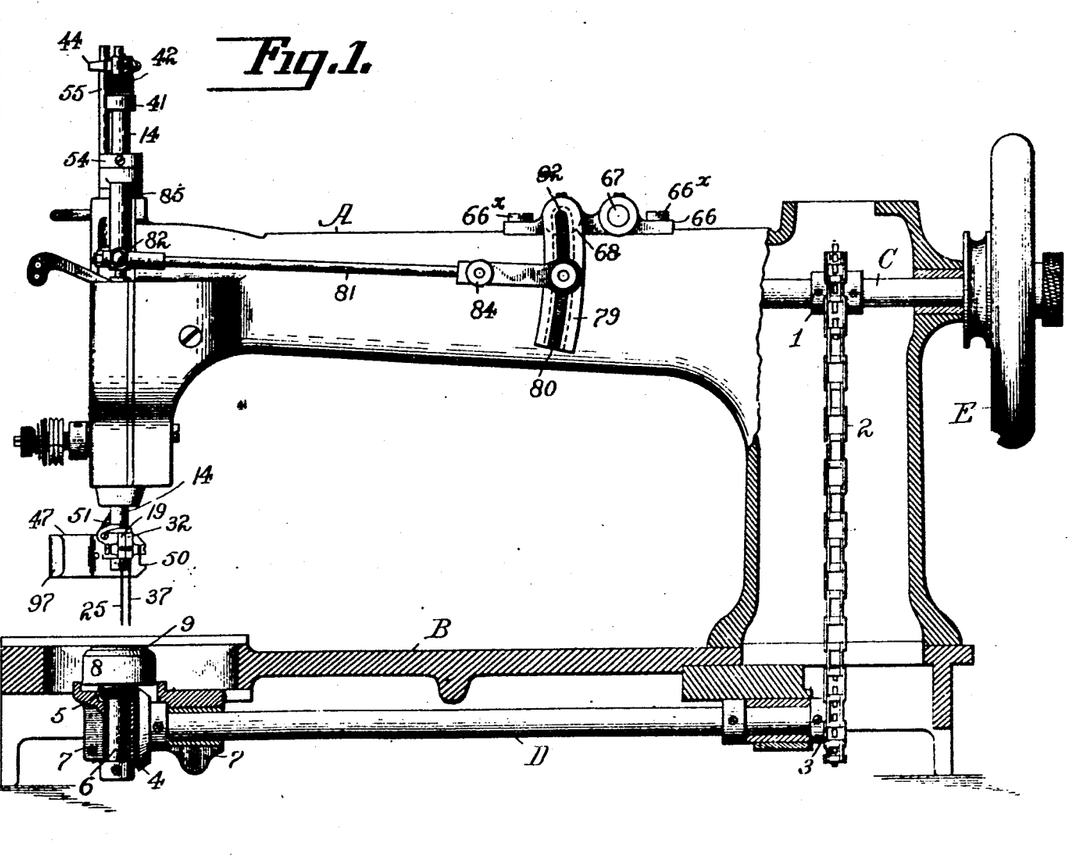
Figure 1 is a front elevation of a machine embodying my invention, parts being broken away to show the driving means.
Figure 2:
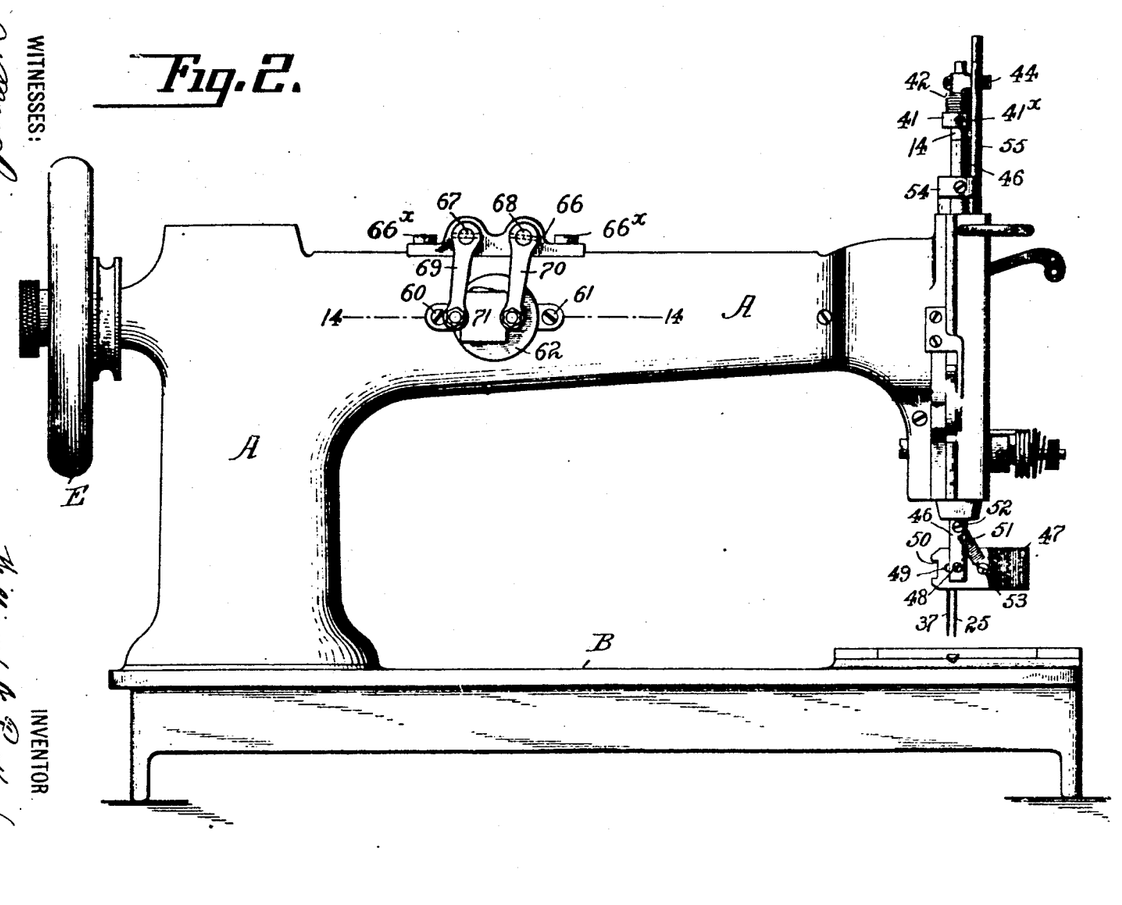
Fig. 2 is a rear elevation of the same.

In suitable bearings in the arm of the machine is mounted a presser-bar 46, the lower end of which is provided with a saw-cut in which is located a presser-foot 47 adapted to swing on the pivotal screw 48, a slot 49 being formed in the shank so as to permit the presser-foot to have a slight vertical movement relatively to its bar. In the upper end of the shank of the said presser-foot is formed a notch 50 which is adapted to embrace the presser-bar and thereby prevent the presser-foot from swinging laterally on its pivot. A coiled spring 51 is connected at one end to a screw 52 set in the presser-bar and at the other end to a screw 53 set in the presser-foot said spring being thus adapted to draw the said presser-foot upwardly so that the notch 50 engages the presser-bar and prevents lateral movement of the presser-foot and thereby securely locks the presser-foot in operative position. When it is desired to move the presser-foot to one side or to the position shown in Fig. 2, the presser-bar is lifted and the presser-foot pressed downwardly to disengage the notch 50 from the presser-bar, after which it is swung laterally on its pivotal screw 48 and retained thus by spring 51. To the upper end of the presser-bar is attached a collar 54 in which is held an upwardly extending rod 55 adapted for engagement with the extending arm 44, and thereby serve as a stop for the said arm. Collar 54 is circularly adjustable on the presser-bar 46 by any suitable means. This construction serves as a means for regulating the extent of the lateral movement of the auxiliary needle 37.

By adjusting the collar 41 circularly on the needle-bar 14, by screw 41×, it can be clearly seen that the tension of the spring 42 exerted on the arm 44 can be increased or decreased and that by adjusting the collar 54 circularly on the presser-bar 46, the location or the extent of the lateral movement of needle 37 can be controlled.

I will now describe the means I provide for moving laterally the needle holders in this machine.

Figure 14:
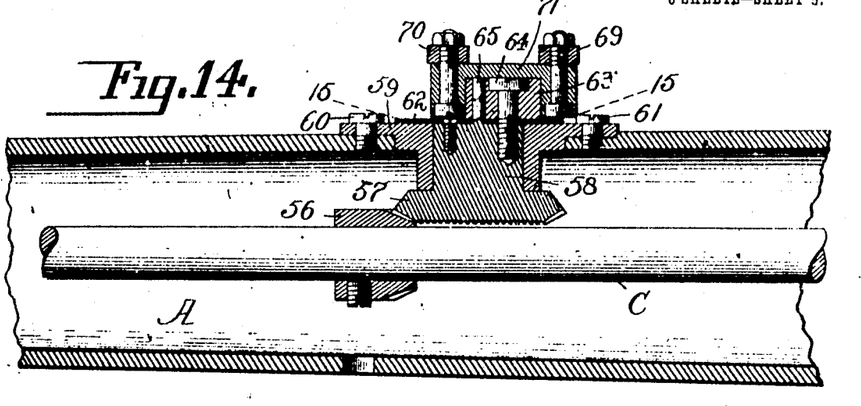
Fig. 14 is a horizontal sectional view taken on the line 14—14 of Fig. 2.

To the upper shaft C is attached a bevel-gear 56 which meshes with the bevel-gear 57, the latter being in size twice the diameter of the former, so that the gear 56 turns twice while the gear 57 turns once. The gear 57 has an extended hub 58 which is adapted to rotate in a bearing 59 which is attached to the arm of the machine by screws 60 and 61, a thin plate 62 attached to the end of the hub 58 retains the gear 57 in operative position as shown in Fig. 14. To the hub 58 I attach a cam 63 by means of a screw 64. A pin 65 formed on the hub 58 and extending from the center thereof serves as a means for properly locating the said cam on the said hub, for holding it rigidly and preventing it from any movement with respect to the hub.

Figure 15:
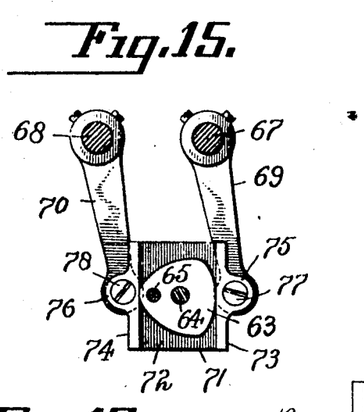
Fig. 15 is a detached vertical sectional view taken on the line 15—15 of Fig. 14, showing the cam and its engaging part in one position.
Figure 16:
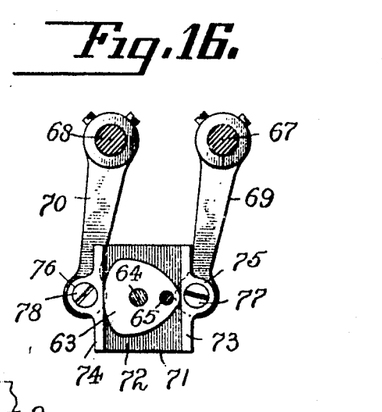
Fig. 16 is a like view, showing the same parts in their opposite position.

On the arm A of the machine, is attached a bracket or bearing 66, by means of screws 66×, and in which are located two short shafts 67 and 68. To the rear end of the said shafts are attached respectively depending arms 69 and 70. A yoke 71 has a way 72 formed in it in which the cam 63 is located and operatively engages walls 73 and 74 of the said way. Ears 75 and 76 are formed on the yoke 71 which are pivotally attached, by means of screws 77 and 78, to the arms 69 and 70 respectively. This construction, as will be clearly seen by reference to Figs. 15 and 16, acts to keep the walls of the way 72 in parallel vertical planes throughout its lateral movements and impart to the arms 69 and 70 movements of equal extent and keeps said arms in parallelism.

The three-cornered or triangular cam 63 is so constructed that during substantially the first quarter of its movement it moves the arms 69 and 70 laterally in one direction and then during substantially the second quarter of its movement said arms are at rest, then during substantially the third quarter of its movement the said arms are moved back to their initial position after which during the fourth quarter of its movement the said arms are again at rest. The cam is of course so timed that it moves the arms 69 and 70 laterally when the needles are disengaged from the work.

In a zigzag sewing machine it is, of course, understood that the lateral movements of the needles take place while they are disengaged from the work and that they are so moved that the needles reciprocate in several different vertical planes and, consequently, it becomes desirable to use a two-to-one movement between the needle-bar driving-shaft and the cam which moves the needles laterally. It is also to be understood that when this two-to-one movement is used, the cam movement is divided into four parts; the first part which moves the needles laterally while disengaged from the work; the second part which gives no lateral movement to the needles so that reciprocation in a fixed vertical plane may be given the needles; the third part which again moves the needles laterally to the first or another position; and the fourth part which again holds the needles from lateral movement during the next reciprocation. The several parts of the cam are of equal extent, as herein shown, so that from the time the cam commences to make its movement to the time it finishes the said movement, the driving-shaft turns substantially half around and the movement is uniform in both directions. By the use of my improved devices herein disclosed, I get the desired movements from the three cornered cam, and this is true whether I use short depending arms or long depending arms, for the reason that the jaws 73 and 74 always remain vertical no matter what the extent of the lateral movement of the arms may be.

The intermediate means, by which the needle-bars are oscillated or turned laterally from the movement of the cam 63, are as follows: To the forward end of the short shaft 68, I attach a downwardly extending segment-arm or lever 79, in which is formed a segmental slot 80, in which is adjustably held one end of a pitman 81, the other end of which is suitably formed to embrace a ball 82, formed on the end of a pin 83, fixed as presently described. The connection 81 is formed in two parts which are adjustably connected by a thumb-nut 84, and by means of which the working position of the needles is adjusted to the right or left as may be desired. The pin or stem 83 is mounted in a downwardly extending tubular arm 85 which arm, at its upper end, is journaled on a bushing 86, the said bushing being secured in the arm of the machine by a pin or screw 86×, a collar 87 serving as a means for retaining the arm or lever 85 in its working position on the bushing 86, and the collar being held to the bushing by screw 87×. In an enlargement of the bore 88, formed in the arm 85, is located a tube 89 which depends from the arm 85 and passes through the outer end 90 of an arm 91 attached to the needle-bar 14, by screw 14ª, as is clearly shown in Fig. 5. The tube 89 is of sufficient extent to remain in engagement with the end 90 of the arm 91 in any of the vertical positions of the needle-bar and is held in the arm 85 by the stem 83 passing through both the tube 89 and the arm 85.

Figures 5, 6, 7, 8, 9, 10, 11:
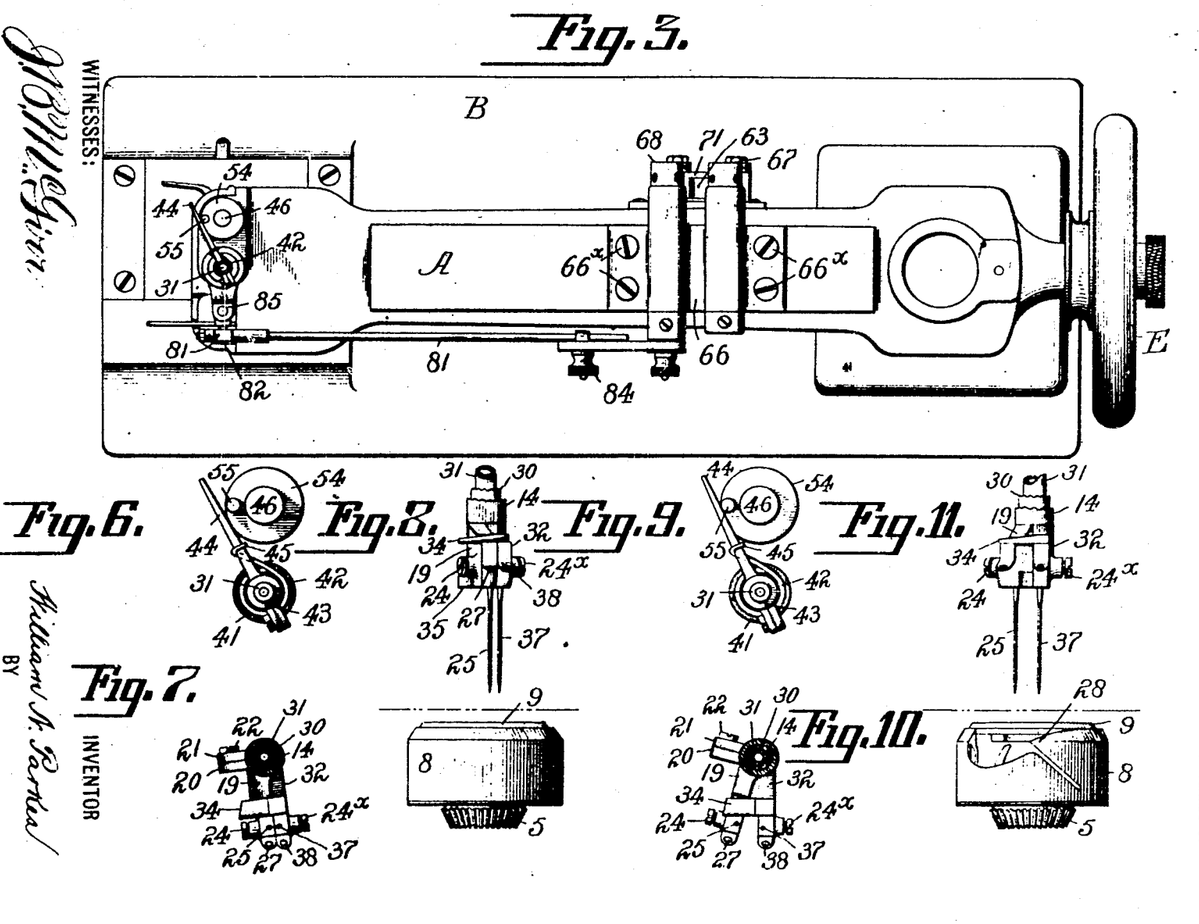
Fig. 6 is a detail partial sectional and plan view showing the needle-bar and coöperating parts.
Fig. 7 is a detail partial sectional and plan view showing the position of the needles when the parts are as shown in Fig. 6.
Fig. 8 is a detail front view, showing the relation of the needles and looper in the position of parts shown in Figs. 6 and 7.
Fig. 9 is a detail similar view to Fig. 6, showing the needle-bar and coöperating parts in a different position.
Fig. 10 is a view similar to Fig. 7, showing the spread of the needles when the parts are as shown in Fig. 9.
Fig. 11 is a detail front view, showing the relation of the separated needles to the looper in the position of parts shown in Figs. 9 and 10.

From the above arrangement of parts, it will be clear that as the cam 63 is rotated, the arm 79 is oscillated, and through it and the intermediate connections, the needle-bar 14 and needles 25 and 35 are oscillated the latter about the periphery of the looper 8. As the end of the connection 81 is adjusted towards or from the pivot of the arm 79, the extent of the lateral movement of the needles is increased or decreased, the pivot of the arm 79 being indicated by reference character 92. When the end of the connection 81 is located over the said pivot 92, no lateral movement will be imparted to the needles. As the auxiliary needle-bar 31 is mounted in the needle-bar 14 and connected thereto to move axially therewith by means of spring 42, it can be clearly seen that the said needle-bar 31 will turn with the needle-bar 14, the tension of the said spring being such that it holds the needle clamps together as shown in Fig. 8. As the needle-clamps 32 and 19 are interlocked, as shown in the several figures, it is of course clear that the movement of the needles vertically is positive, and as the two needle-bars are securely connected by means of the spring 42, that the movement of the needle-bars to the left is synchronous until the arm 44 comes into engagement with the rod 55. As this engagement takes place, the needles are positively separated against the action of the spring 42, the needle 25 being moved away from the auxiliary needle 37 and the extent of the separation of the said needles depending upon the adjustment of the rod 55 and the time of contact of arm 44 therewith. Fig. 11 shows the needles separated, and taking the position of the needle-clamps, as shown in this figure, it will be seen that the clamp 19 is the one that is rigidly attached to the needle-bar 14 so that the return or right-hand movement of the said clamp will be positive and that the auxiliary clamp 32 will not move to the right until said clamp 19 engages it thus also making the return movement of the clamp 32 positive. The auxiliary needle-bar 31, and the needle-bar 14 are connected by means of the spring 42 as before stated, but said auxiliary needle-bar is not operated in either direction by said spring. The tension of the spring draws in the direction that the needle-bar 14 moves when it is moving from right to left, but when this movement commences the needle holders are in the position shown in Fig. 8, so of course the spring and the auxiliary bar are carried bodily laterally to the left when the needle-bar 14 is moved in this direction. But when the arm 44 that is carried by the auxiliary needle-bar comes into contact with the stop pin 55, the lateral movement of the auxiliary needle-bar is arrested, and it has no further movement until the return movement of the needle-bar 14 has been made to a sufficient extent to bring the needle holder carried by it again into engagement with the auxiliary needle holder, when the latter is again carried along by the movement of the needle-bar 14. It is thus seen that the spring 42, is actuated against its tension by the needle-bar 14 when the movement of the auxiliary bar is arrested by the stop pin 55, and that it is again returned to its normal position when the needle holder carried by the needle-bar 14 comes into contact with the auxiliary needle holder. Thus it is seen that during the time that the spring 42 is actuated the auxiliary needle holder is not moved laterally, so it cannot be said that the auxiliary needle-bar is actuated laterally in either direction by the spring 42. It is therefore to be understood that the usual conditions of pushing a part positively laterally in one direction against the action of a spring, and then depending on the action of said spring to return said part to its initial position is not present in this machine. The auxiliary bar is operated laterally in both directions by the movement of the bar 14, and the movements of this bar are positive, so the usual limitations as to speed when a part is actuated by a spring, are not present in this construction.

Figure 27:
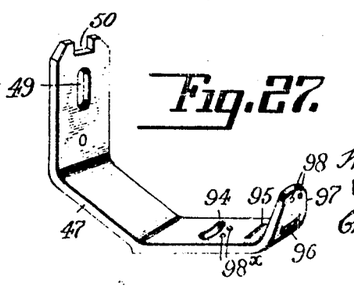
Fig. 27 is a perspective view of a form of presser-foot found to be suitable for the purposes of my machine.

Referring to Figs. 28 and 29, showing another form of the needle-clamps, through the clamp 32 is passed a screw 93 which engages the needle-clamp 19 and can be adjusted so as to keep the said clamps suitably apart or so the needles will not get so close together as they are, for example, in Fig. 8. In practice, however, should a greater distance be desired between the needles, or should it be desired to bring them closer together, the clamps would be constructed accordingly, but of course where various lateral positions might be desired, the screw 93, or something similar, may be used to advantage. The presser-foot, as best shown in Fig. 27, is provided with a curved transverse needle-slot 94, two slots for guiding ribbon, one 95 in the foot in front of the needle-slot and the other 96 in the upturned toe 97 of the foot, and with two cord-guiding apertures 98 near the top of said toe and two others 98× near the needle-slot. Suitable ribbon and cord-guides will be placed upon the machine for guiding the cords and ribbon to the presser-foot, and tension devices may be supplied for properly controlling the ribbon and cords.

Figure 19:
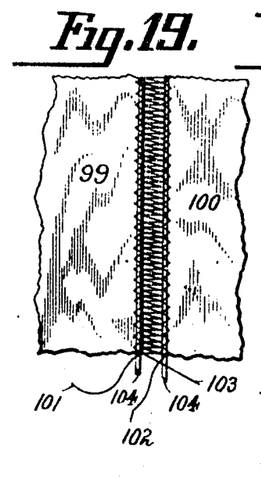
Figs. 19 to 26 inclusive indicate the principal seams, stitching and fancy effects this machine is intended to make.
Figure 20:
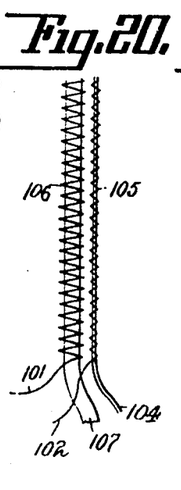
Figure 21:
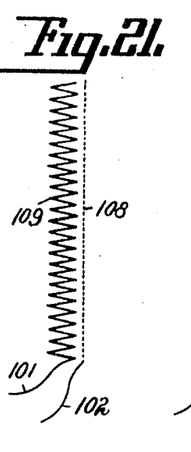
Figure 22:
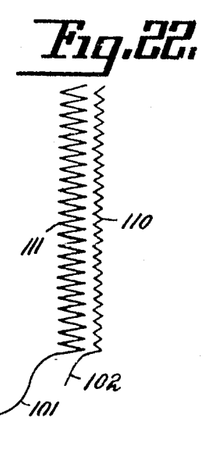
Figure 23:
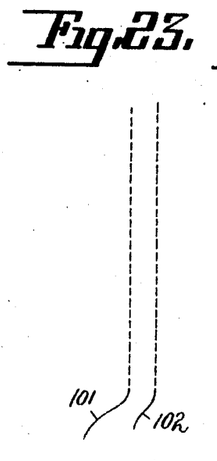
Figure 24:
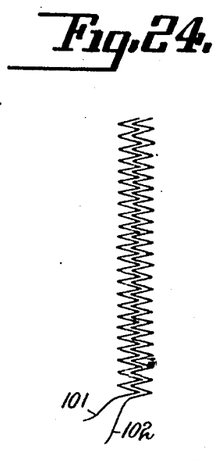
Figures 25, 26:
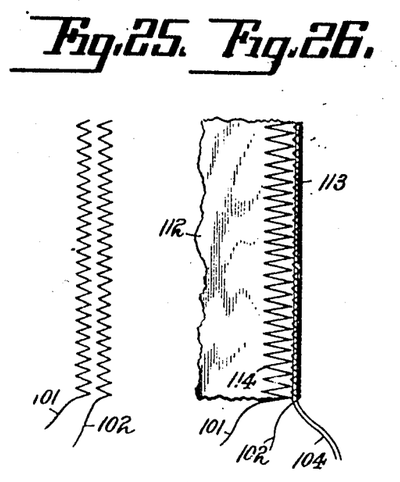

Referring now to the diagrams of stitches and work indicated in Figs. 19 to 26, the seam shown in Fig. 19 is made by feeding the adjacent edges of two pieces of goods under the needles, and keeping the edges of the said goods separated in any suitable manner: The pieces of work are indicated by 99 and 100, the needle-threads by 101 and 102, the connecting looper or locking-thread 103, extending across the space between the two pieces of work, as shown, or covering the edges should the same be abutted or superposed. The cords 104 may or may not be led under the respective lines of stitching. The seam, stitching or effect shown in Fig. 20, is produced by adjusting the collar 54, so that an extensive movement may be given to the main needle-bar 14, and a comparatively small movement to the auxiliary bar 31, an adjustment of parts being made substantially as shown in Fig. 28. This will produce a narrow line of zigzag stitching 105, under which a cord 104 may be led, and a wide line of zigzag stitching 106, under which a ribbon 107 may be led. The seam, stitching or effect of Fig. 21 is produced by so adjusting the arm 44 that it remains in contact with pin 55 all the time, the result being that no lateral movement is imparted to the auxiliary needle and a line of straight stitches 108, is made together with a line of zigzag stitches 109. Ribbon or cord may be led under the latter. Fig. 22 shows a modification of the effects of Fig. 20, the cords and ribbon being omitted and the respective lines of stitching 110 and 111, being slightly wider. In the seam or effect shown in Fig. 23, the connection 81 is over the pivot 92, of the lever 79 so of course there is no lateral movement given to the main needle 25, and in order to have the separation between the seams as shown in the said figure, the screw 93 may be used as shown in Figs. 28 and 29, and the needle 37 being held from lateral movement as described above in connection with Fig. 21. The interlocking effect of the zigzag stitching, shown in Fig. 24, is produced by giving to both needles the same extent of lateral vibration, such extent being sufficient to cause the threads of the needles to alternately overlap. The seam or effect of Fig. 25 is produced by adjusting the needles far apart and giving them the same lateral movement, but not sufficient in extent to cause the threads to overlap. Fig. 26 shows how the edge of a piece of fabric 112, can be overstitched by the auxiliary needle at 113, and have a line of ornamental stitching 114 laid near the edge. A cord 104 may also be laid under the overedge stitches along the edge of the fabric. This gives both an ornamental and a serviceable finish, producing in effect an artificial selvage. In producing the effects of Figs. 19—24—25, the arm 44 does not engage the pin 55 at all. It will be understood that when the arm 44 engages the pin 55 the variation in the extent of the lateral movement of one of the said needles with respect to the other is produced.

Other seams than those shown might be made, but it is thought that these are sufficient to indicate the scope of the machine.

The disposition of the hook in my present machine so that it revolves in a horizontal plane, and the location, and adaptation of the needles so they move laterally in an arc of a circle that is concentric with the axis of rotation of the hook prevents any displacement laterally between the needle and the hook in the different lateral positions of loop engagement. Revolving the hook twice to each reciprocation of the needle, adapts the hook to be revolved in a horizontal plane, and thereby makes it available as an element in the combination of elements whereby the needles are moved laterally in an arc of a circle that is concentric with the axis of the hook.

To steady the movements of the link 11 and cam 13, the lower end of the former may be extended rearwardly and provided with an anti-friction roll a, running in a guide b, secured in the head of the machine in rear of the needle-bar. This is not essential however.

It will be noted that the presser-foot and opposing portion of the cloth-plate constitute, broadly considered, a work-holder; but, it is to be understood that any usual form of work-holder, which will properly hold the work for the reception of the stitches and production of the several ornamental effects, may be used and employed within the scope and spirit of my invention.

Having thus described my invention, what I desire to claim and secure by Letters Patent is:

1. In a sewing machine, a stitch-forming mechanism comprising a looper that revolves about an axis, two needles adapted to move laterally about an axis that is coincident with the axis of said looper, and means for moving one of said needles laterally a greater extent than the other.

2. In a sewing machine, a stitch-forming mechanism comprising a looper or hook that moves circularly about an axis, a plurality of reciprocating needles, in combination with means which produce between said needles relative lateral movements of different extent about a single axis that is coincident with the axis of said looper.

3. In a sewing machine, a stitch-forming mechanism comprising a looper that revolves about an axis, two needles adapted to vibrate laterally about an axis that is coincident with the axis of said looper, means for vibrating one of said needles laterally a greater extent than the other, and means for changing laterally the vibrating positions of said needles relative to each other.

4. In a sewing machine, a stitch-forming mechanism comprising a looper that moves circularly about an axis, two reciprocating needles, means for producing between said needles relative lateral movements of different extent about an axis that is coincident with the axis of said looper, and means for changing the amplitude of said lateral movements.

5. A sewing machine comprising a feeding mechanism, a stitch-forming mechanism, including a plurality of reciprocating needles, in combination with means for simultaneously producing between said needles and said feeding mechanism relative vibratory movements of different extent so as to produce lines of zig-zag stitches of different width, and means for guiding a ribbon under such stitches.

6. A sewing machine comprising a feeding mechanism, a stitch-forming mechanism including a plurality of reciprocating needles, in combination with means for simultaneously producing between said needles and said feeding mechanism relative vibratory movements of different extent so as to produce lines of zig-zag stitches of different width, and means for guiding a ribbon under one and a cord under another of such lines of stitches.

7. A stitch-forming mechanism comprising a plurality of vertically reciprocating and laterally vibrating needles and a rotary looper, means for actuating the needles so as to simultaneously give to the latter vibratory movements of different extent, and means for varying the thrust of the needles.

8. A stitch-forming mechanism comprising a plurality of vertically reciprocating and laterally vibrating needles and a rotary looper, means for actuating the needles so as to simultaneously give to the latter vibratory movements of different extent, and means for regulating the thrust of the needles to accord with their lateral working positions.

9. A stitch-forming mechanism comprising a plurality of vertically reciprocating and laterally vibrating needles and a rotary looper, means for actuating the needles so as to simultaneously give to the latter vibratory movements of different extent, means for varying the thrust of the needles, and means for actuating the needles and looper with a ratio of two rotations of the latter to a single reciprocation of the former.

10. A stitch-forming mechanism comprising a plurality of vertically reciprocating and laterally vibrating needles and a circularly moving looper, means for actuating the needles so as to simultaneously give to the latter vibratory movements of different extent, and mechanism for actuating the needles and looper, including means for giving to the looper a plurality of movements to a single reciprocation of the needles.

11. A stitch-forming mechanism comprising a plurality of reciprocating and vibrating needles and a circularly moving looper, mechanism for actuating the parts including means for moving the needles about the axis of the looper, and means for actuating the looper a plurality of times to a single reciprocation of the needles.

12. In a sewing machine, a stitch-forming mechanism comprising two reciprocating needles and a curved looper, and means for moving one of the needles concentrically about the periphery of the looper and relatively to the other needle.

13. A stitch-forming mechanism for sewing machines including two needle-holders, one being carried and driven by the other, a plurality of needles carried by the said holders, means for reciprocating the said holders, and means for moving one of the said holders laterally with respect to the other.

14. A sewing machine comprising a plurality of reciprocating needle-bars having their longitudinal axes coincident, means for oscillating said needle-bars about said axis, and a single looper which coöperates with said needles.

15. A sewing machine comprising a plurality of reciprocating needle-bars having their longitudinal axes coincident, and means for oscillating one of said needle-bars about said axis a greater extent than the other.

16. In a sewing machine, a stitch-forming mechanism comprising a vertically reciprocating needle-holder adapted to turn on its axis, a second needle-holder also adapted to turn on its axis, means whereby the said second needle-holder is reciprocated from the movement of the first needle-holder, and means for turning the said needle-holders on their axes.

17. A stitch-forming mechanism comprising a looper, a plurality of reciprocating needles adapted to coöperate with the said looper, means for actuating the needles and for moving one of the said needles laterally with respect to the other, and means for rotating the said looper a plurality of times to each reciprocation of the needles.

18. A stitch-forming mechanism comprising a looper, a plurality of reciprocating needles, means for actuating the needles and or moving the said needles laterally a different extent with respect to each other, and means for rotating the said looper twice to each reciprocation of the needles.

19. A stitch-forming mechanism comprising a looper adapted to rotate in a horizontal plane, a plurality of reciprocating needle-holders the axes of which are coincident with the axis of the said looper, means for oscillating the said needle-holders, and means for rotating the said looper twice to each reciprocation of the said needle-holders.

20. The combination in a stitch-forming mechanism, of a reciprocating needle-holder, a second needle-holder carried by the said first needle-holder, a needle eccentrically attached to each of the said needle-holders, means for turning the needle-holders on their axes, and a single looper for coöperating with the said needles.

21. A stitch-forming mechanism comprising two needle-holders, yielding means connecting the needle-holders, means for reciprocating the holders, means for oscillating the holders and a stop for limiting the oscillating movement of one of the holders.

22. A stitch-forming mechanism comprising two reciprocating and laterally moving needle-holders, one embraced by the other, yielding means connecting the holders, means for actuating the holders, and means for varying the movements of the holders.

23. A stitch-forming mechanism comprising two reciprocating and vibrating needle-holders, one embraced by the other, yielding means connecting the holders, means for actuating the holders, and means for controlling the movements of the holders relatively.

24. A stitch-forming mechanism comprising two reciprocating and laterally moving holders, one embraced by the other, yielding means connecting the holders, means for actuating the holders, and means for arresting the lateral movement of one holder while the lateral movement of the other continues.

25. A stitch-forming mechanism comprising two reciprocating needle-bars located one within the other, means for yieldingly connecting the said bars, means for oscillating said bars, a needle-holder carried by each of said bars, and a stop for limiting the oscillating movement of one of the holders.

26. A stitch-forming mechanism comprising two reciprocating needle-bars located one within the other, means yieldingly connecting the said bars, a needle-holder carried by each of said bars, and means for varying the movements of the holders.

27. A stitch-forming mechanism comprising two reciprocating needle-bars located one within the other, means for yieldingly connecting the bars, a needle-holder connected to each bar, and means for controlling the movements of the holders relatively.

28. A stitch-forming mechanism comprising two reciprocating needle-bars one located within the other, means for yieldingly connecting the bars, a needle-holder connected to each bar, and means for arresting the lateral movement of one holder while the lateral movement of the other holder continues.

29. A stitch-forming mechanism comprising a plurality of vertically reciprocating and laterally vibrating needles, means connecting the needles so that their movements may be given in unison, means for actuating the needles, and means for arresting the lateral movements of one of the needles while the lateral movement of the other continues.

30. A stitch-forming mechanism comprising a plurality of reciprocating needles, means connecting the needles permitting their lateral separation, means for actuating the needles and causing their reciprocations to be in unison, and means for varying the thrust of said needles.

31. A stitch-forming mechanism comprising a plurality of reciprocating and vibrating needles, means connecting the needles permitting their lateral separation, means for actuating the needles, means for controlling the lateral separation of the needles, and means for varying the thrust of the needles.

32. A stitch-forming mechanism comprising a plurality of reciprocating and vibrating needles and a looper, means connecting the needles permitting their lateral separation, means for actuating the needles and looper, means for controlling the extent of separation of the needles, means for varying the thrust of the needles, and means for giving the needles and looper a ratio of movement involving two rotations of the latter to one reciprocation of the former.

33. A stitch-forming mechanism comprising two reciprocating and laterally moving needle-holders, one carrying the other, yielding means connecting the holders, means for actuating the holders, and means for controlling the movements of one of the holders including an arm carried by the latter and a fixed stop.

34. A stitch-forming mechanism comprising a plurality of reciprocating and vibrating needle-holders, means for actuating the said holders, and an adjustable stop for limiting the extent of the vibratory movement of one of the holders.

35. A stitch-forming mechanism comprising a reciprocating needle-bar, a second needle-bar mounted within the first needle-bar, a needle-holder carried by and offset from each bar, a needle carried by each of the said holders, means for oscillating the needle-bars on their axes, and a complemental stitch-forming mechanism for coöperating with the said needles.

36. A stitch-forming mechanism comprising a plurality of reciprocating and vibrating needles means for actuating and for moving the said needles laterally a different extent with respect to each other, and means for feeding a cord or filling under one of the said needles.

37. A stitch-forming mechanism comprising a plurality of reciprocating and laterally moving needles, means for actuating the needles, and means for feeding a cord or filling under the respective needles.

38. A stitch-forming mechanism comprising two reciprocating and vibrating needles, means for actuating the needles and for moving the same laterally to cause a narrow overseam stitch to be made by one of the needles and a broad overseam stitch to be made by the other, and means for feeding a cord or filling under the stitches made by the needle having the narrow lateral movement.

39. A stitch-forming mechanism comprising two needle-bars, one of which is mounted to turn in the other, actuating means including a cam, means intermediate the cam and one of the bars whereby the said bar is moved laterally, and means between the two bars whereby one is turned laterally by the movement of the other.

40. In a sewing machine, a stitch-forming mechanism comprising a plurality of reciprocating needle-holders free to move laterally with respect to each other, yielding means connecting the said holders, means for reciprocating and for turning the said holders laterally, a presser-bar, and adjustable connecting means between the said presser-bar and one of the holders adapted to limit the lateral movement of the latter.

41. In a sewing machine, a stitch-forming mechanism comprising a plurality of vertically reciprocating and laterally oscillating needle-bars, means for actuating the same, an arm attached to one of the said needle-bars, a presser-bar, a stop for limiting the oscillating movement of one of the said needle-bars mounted on the said presser-bar, and means for circularly adjusting the said stop.

42. In a sewing machine, a stitch-forming mechanism comprising two reciprocating and laterally moving needles, mechanism for moving said needles laterally relative to each other, means whereby the lateral movement of one of said needles may be prevented, a looper, and means for rotating said looper a plurality of times to each reciprocation of said needles.

43. A stitch-forming mechanism comprising a plurality of reciprocating and laterally vibrating needles, means for actuating the needles and causing one of the said needles to be vibrated laterally a greater extent than the other, and means for varying the depth of the thrust of the said needles.

44. A stitch-forming mechanism comprising a plurality of vertically reciprocating needle-bars adapted to turn about a single center, means for actuating and for turning the said needle-bars a varying distance with respect to each other, and means for varying the depth of the thrust of the said needle-bars.

45. A sewing machine having a plurality of reciprocating and oscillating needle-bars, means for reciprocating said bars, means for oscillating said bars including a cam, a plurality of rocking devices, and means connecting the cam and devices for maintaining parallelism of the latter.

46. In a sewing machine, a stitch-forming mechanism comprising two needle-bars one of which is mounted on and carried by the other, a cam, a connection between the cam and one of the said needle-bars whereby it is oscillated from the movement of the said cam, and a connection between the said first needle-bar and the second needle-bar whereby the latter is oscillated from the movement of the former.

47. A stitch-forming mechanism comprising a tubular needle-bar, a second needle-bar journaled in the first needle-bar, a needle-clamp carried by each of the said needle-bars, said clamps having interlocking means permitting independent lateral movements of the clamps, and means for reciprocating and laterally moving the clamps.

48. A stitch-forming mechanism comprising a tubular needle-bar, a bushing in each end of the said bar, a second needle-bar mounted in the said bushings, a needle carried by each bar, means for vertically reciprocating the said bars and means for independently oscillating the said bars.

49. A stitch-forming mechanism comprising a plurality of needle-bars mounted to turn about their longitudinal axes, a needle carried by each of the said needle-bars and disposed so that when the bars are oscillated the needles are moved laterally, and means for oscillating the said bars.

In testimony whereof I have hereunto signed my name in the presence of two subscribing witnesses.

WILLIAM N. PARKES.

Witnesses:
WM. W. KETCHUM,
CHAS. McC. CHAPMAN.